J. WILKINSON.
GEARING.
APPLICATION FILED OCT. 9, 1919.

1,401,662. Patented Dec. 27, 1921.

Inventor:
James Wilkinson,
by Albert G. Davis
His Attorney.

UNITED STATES PATENT OFFICE.

JAMES WILKINSON, OF SCHENECTADY, NEW YORK, ASSIGNOR TO GENERAL ELECTRIC COMPANY, A CORPORATION OF NEW YORK.

GEARING.

1,401,662.      Specification of Letters Patent.      Patented Dec. 27, 1921.

Application filed October 9, 1919. Serial No. 329,493.

*To all whom it may concern:*

Be it known that I, JAMES WILKINSON, a citizen of the United States, residing at Schenectady, in the county of Schenectady, State of New York, have invented certain new and useful Improvements in Gearings, of which the following is a specification.

In connection with gearing of the type comprising a pinion driving a low speed gear wheel having its shaft coupled to a driven load it has been found desirable in some instances to provide a coupling in the driven shaft which is flexible circumferentially and which preferably is capable of a limited amount of axial adjustment, and the object of my present invention is to provide an improved structure and arrangement wherein a coupling of such character is mounted inside the driven gear wheel and forms in substance a part of the gearing.

For a consideration of what I believe to be novel and my invention, attention is directed to the accompanying description and the claims appended thereto.

Figure 1:
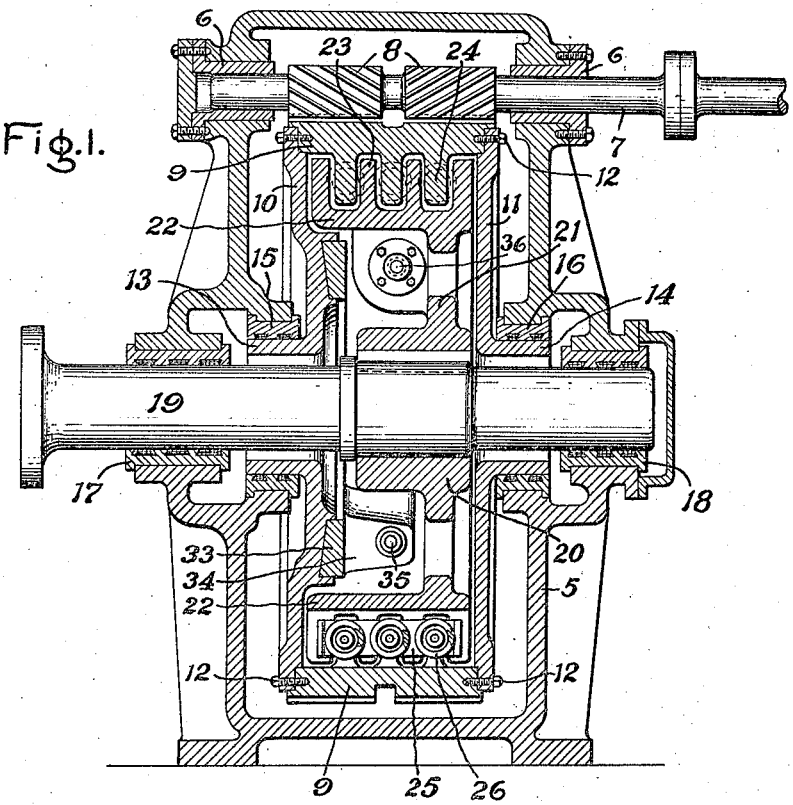
Figure 2:
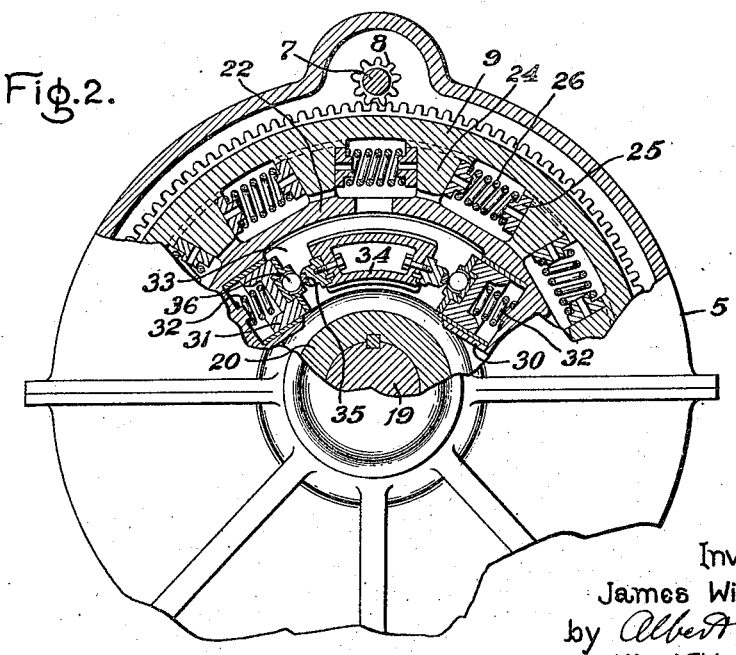

In the drawings, Figure 1 is a vertical sectional view of a gearing embodying my invention, and Fig. 2 is a side elevation partly in section thereof.

Referring to the drawing, 5 indicates a casing provided with bearings 6 which carry a shaft 7 on which is a pinion 8. In the present instance a pinion of the double helical type is illustrated. Meshing with pinion 8 is a gear wheel comprising a rim 9 having teeth on its outer surface, and two side plates 10 and 11 which are suitably fastened to rim 9 as by bolts 12 and are provided with hollow stub shafts 13 and 14 carried in bearings 15 and 16 in casing 5. Casing 5 is also provided with a pair of bearings 17 and 18 which carry a driven shaft 19. Bearings 15, 16, 17 and 18 are in axial alinement and bearings 15 and 16 which form a pair are of greater diameter than bearings 17 and 18 which are another pair. Shaft 19 passes through stub shafts 13 and 14, the diameter being such that there is a suitable clearance between shaft 19 and the bores of shafts 13 and 14. With this arrangement it will be noted that the gear wheel is supported in bearings separate from those for shaft 19.

Fastened to shaft 19 between side plates 10 and 11 is a hub 20 which carries a web 21 at the periphery of which is a rim 22. On the outer surface of rim 22 are a plurality of spaced rings of projecting teeth 23. The teeth of each ring are spaced apart circumferentially and the teeth of all the rings are in axial alinement to form axially extending rows of teeth. Depending radially inward from the inner surface of rim 9 are a plurality of spaced rings of teeth 24 which fit between the rings of teeth 23 and are axially alined therewith. The side edges of the axial rows of teeth 23 and 24 are flush and extending axially across such edges are spring shoes 25 between which are located springs 26. In the present instance three springs 26 are indicated in Fig. 1 each of which is directly in line with a tooth 24 and overlaps the two adjacent teeth 23. Springs 26 are inserted with a desired degree of initial compression so they yield to permit relative circumferential movement between rims 9 and 22 only after a predetermined torque has been placed thereon. It will be clear that movements can take place in either direction. Also teeth 23 and 24 have both axial and radial clearances as shown in Fig. 1 which permits of movement of shaft 19 and the parts connected thereto relatively to the gear wheel.

In order to dampen out vibrations or oscillations between the gear wheel and rim 22 I provide suitable dash-pots which may be of any structure found desirable. In the present instance I have shown the dash-pots as comprising cylinders 30 carried by rim 22 and web 21 in which are located pistons 31. Adjacent cylinders face in opposite directions and the pistons in them are forced toward each other by springs 32. Carried by a ring 33 attached to side plate 10 are abutments 34 which project between each pair of cylinders and are provided at their ends with wear pieces 35 which engage bearing balls 36 on the ends of pistons 31. The dash-pots may be in the form of oil dash-pots or other type as found desirable.

Pinion shaft 7 may be connected to an elastic fluid turbine for example and gear shaft 19 may be connected to a propeller shaft of a ship or other apparatus to be driven.

In operation pinion 8 drives the gear wheel comprising rim 9 and side plates 10 and 11 in the usual manner and rim 9 in turn drives rim 22 through springs 26 thus driving shaft 19. In case of sudden shocks or blows on shaft 19 springs 26 will yield thus preventing such shocks or blows from reaching the gear teeth.

It is to be noted that the gear wheel has bearings of its own which are independent of the bearings for shaft 19 so that any angular variation of shaft 19 or axial movement of it does not affect the meshing of the gear and pinion. At the same time the arrangement is short and compact and is contained entirely within a single casing.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim is new and desire to secure by Letters Patent of the United States, is:—

1. In combination, a casing, a gear wheel located in the casing, said gear wheel comprising a rim and side plates, hollow shaft means for supporting said gear wheel carried by said side plates, separate bearings in the casing for said shaft means, a shaft which extends through said hollow shaft means, bearings in the casing for said shaft, and yieldable coupling means located between said side plates and connecting said shaft to said gear wheel.

2. In combination, a casing, a gear wheel located in the casing, said gear wheel comprising a rim and side plates, hollow shaft means for supporting said gear wheel carried by said side plates, separate bearings in the casing for said shaft means, a shaft which extends through said hollow shaft means, bearings in the casing for said shaft, a second rim located between said side plates and carried by said shaft, interleaving teeth carried by said two rims, and spring means located between said teeth.

3. In combination, a casing, two pairs of axially alined bearings in the casing, one of which is of greater diameter than the other, a gear wheel having hollow stub shafts which are carried in said pair of bearings of greatest diameter, a shaft which extends through said stub shafts and is carried in said other pair of bearings, and yielding coupling means located within the confines of said gear wheel and connecting said second named shaft to said gear wheel.

4. In combination, a casing, a gear wheel located in the casing, said gear wheel comprising a rim and side plates, hollow shaft means for supporting said gear wheel carried by said side plates, bearings in the casing for said shaft means, a shaft which extends through said hollow shaft means, bearings in the casing for said shaft, a second rim located between said side plates and carried by said shaft, interleaving teeth carried by said two rims, spring means located between said teeth for connecting said rims, and dash-pot means located between said side plates for preventing vibrations.

5. In combination, a gear wheel comprising a rim and side plates, teeth on said rim, hollow stub shafts for the gear wheel carried by said side plates, a shaft which extends through said stub shafts, a rim carried by said second named shaft, said rim being located between said side plates and spaced from said gear wheel rim, rows of interleaving teeth carried by said rims, springs between said teeth, a casing, separate bearings in the casing for said shafts, a pinion meshing with said gear wheel, and bearings in said casing for the pinion.

In witness whereof, I have hereunto set my hand this 8th day of October, 1919.

JAMES WILKINSON.